March 17, 1953 R. A. TOBIS 2,631,605
SPRING LOADED SAFETY VALVE
Filed Nov. 23, 1949 6 Sheets-Sheet 2

Inventor
Robert A. Tobis
by Roberts Cushman & Grover
Attys

March 17, 1953 R. A. TOBIS 2,631,605
SPRING LOADED SAFETY VALVE
Filed Nov. 23, 1949 6 Sheets-Sheet 3

Inventor
Robert A. Tobis
by Robert Cushman & Grover
Att'ys.

March 17, 1953   R. A. TOBIS   2,631,605
SPRING LOADED SAFETY VALVE
Filed Nov. 23, 1949   6 Sheets-Sheet 6

Inventor
Robert A. Tobis
by Roberts Cushman Grover
Att'ys

Patented Mar. 17, 1953

2,631,605

UNITED STATES PATENT OFFICE 2,631,605

SPRING LOADED SAFETY VALVE

Robert A. Tobis, Bridgeport, Conn., assignor to Manning, Maxwell & Moore, Incorporated, New York, N. Y., a corporation of New Jersey Application November 23, 1949, Serial No. 129,094

14 Claims. (Cl. 137—472)

This invention relates to spring-loaded pop safety valves of the type wherein high lift is attained by deflecting the escaping pressure fluid from its normal path thereby developing a reaction force sufficiently great to insure the desired full lift of the valve disk from its seat.

One object of the present invention is to provide a spring-loaded safety valve whose force curve closely approximates its spring curve. A further object is to provide a spring-loaded safety valve which pops at a substantial lift in response to static pressure and which has low blowdown and which is commercially practical and reliable, and wherein high lift (to provide substantially maximum capacity of discharge) is obtained by the reactive force of the escaping fluid. A further object is to provide a spring-loaded valve having a relatively high pop lift in response to static pressure and which then continues to open substantially to full capacity in response to reactive force, and with provision for adjustment so that the transition from the static pressure effect to reaction force effect may be smooth and uninterrupted. A further object is to provide a valve having means for so controlling the lift that it may be employed with equal effectiveness under a wide range of conditions, for example, for use with superheated steam or with saturated steam. A further object is to provide a valve having simple means for adjusting it to all conditions of use so that under all conditions it may be depended upon to provide sharp and high pop, high lift and low blowdown. A further object is to provide a valve of simple construction, easy to manufacture, and which in general conforms to conventional valve usage, but which provides maximum capacity coupled with low blowdown. Other and further objects and advantages of the invention will be pointed out in the following more detailed description and by reference to the accompanying drawings wherein:

Reference to the load-lift or force curve is necessary in designing a spring-loaded safety valve. The characteristic shape of the force curve is determined by the structural design of the valve, and for any given design is substantially unchanged by variations in pressure and thus is indicative to the designer of the degree to which his particular design conforms to theoretical perfection. This force curve is a graph of the measurements of the total force exerted by the pressure fluid issuing through the valve at various lifts up to the maximum.

Inasmuch as the resistance of a spring as it is compressed is graphically represented by a practically straight line, the force curve of the valve should likewise be a straight line in theory, at least, and very close to the spring curve in order to attain reasonable blowdown. The point of maximum departure of the force curve from the substantially straight spring curve indicates the blowdown of the valve.

The most important feature of practical safety design concerns the means whereby the desired force curve is attained. The first safety valve was probably a plug loaded by means of a weight. Such a plug would lift slightly from its seat when the pressure beneath the plug equalled the load imposed by the weight. Since the lifting of the plug exposed to the pressure fluid an area of the plug which was but slightly greater than was exposed before the plug lifted, such a valve had no pop action. However, since the load exerted by the weight remains constant, such a valve plug would lift in response to increasing over-pressure in proportion to the increase of pressure exerted on the plug, but such weight-loaded valves are unsatisfactory by reason of low capacity and the practical difficulty in applying sufficient weight. For this reason spring-loaded valves are almost universally used, but, as already noted, the resistance exerted by a spring increases directly with the lift of the valve from its seat. Thus when employing a spring as the loading element, it is necessary to provide means (other than mere increase in over-pressure) for increasing the lifting force as the valve rises.

Several methods have been devised for so utilizing the force of the pressure fluid thereby to obtain the required lift. One such method involves the employment of a so-called "huddling chamber" (Fig. 7) an arrangement which provides an extended area for application of static fluid pressure as the valve begins to rise. Another method (Fig. 9) employs reaction force obtained by diverting the escaping fluid from its normal path.

When using the huddling chamber (Fig. 7), the valve usually is provided with a vertically adjustable blowdown ring A coaxial with the outside of the valve seat and forming the side wall of the huddling chamber, and the valve disk B is provided with an overhang or roof C constituting the upper wall of the huddling chamber, the latter opening peripherally into a narrow annular space between the edge of the roof and the upper edge of the blowdown ring. With this arrangement, the least lift of the valve from its seat allows pressure fluid to enter the huddling chamber where the pressure acts upon the large area afforded by the overhanging roof, thereby assisting the pressure which acts upon the valve disk proper to raise the valve against the constantly increasing resistance of the loading spring.

In the reaction type valve (Fig. 9), a cylindrical deflecting sleeve E is arranged coaxially with the valve disk F and so as to embrace the valve disk, the deflector sleeve customarily constituting a guide for the valve disk as it rises from its seat. The space immediately surrounding the valve seat is substantially unobstructed, so that the steam is free to expand outwardly without opposition. In this reaction type valve, when the pressure beneath the seat area of the valve disk equals the spring load, the disk lifts very slightly, permitting steam to escape through the annular passage between the disk and the top edge of the seat bushing G, thus causing the disk to recede from its seat until in receding it rises above the lower edge of the deflecting sleeve E. Usually this initial lift, due to static pressure, is very slight in valves of this type, for example, not more than 5% of the desired maximum lift. The sleeve E now deflects the fluid downwardly substantially 180° from its normal path, producing a reaction pressure which suddenly raises the disk F to maximum lift against the constantly increasing force of the spring. However, it is not possible in a simple reaction type valve to obtain the high lift essential to maximum capacity coupled with the desired low blowdown.

Figures 7, 8:
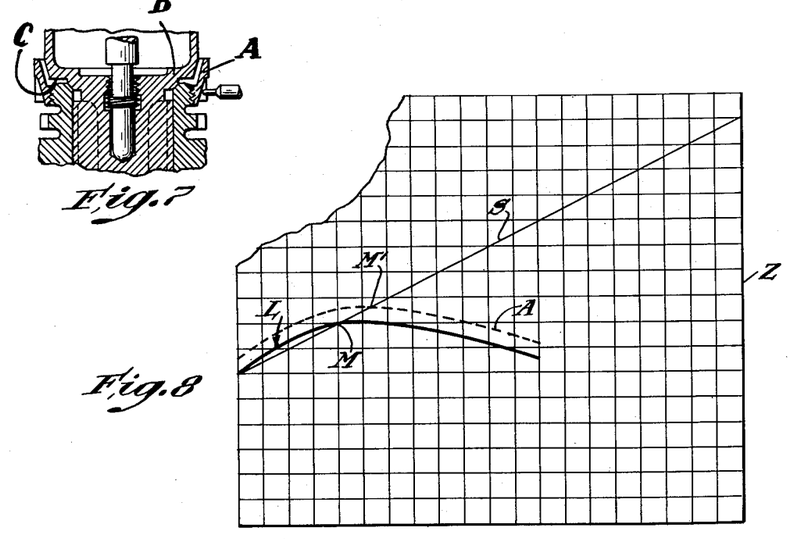
Fig. 7 is a fragmentary vertical section showing a conventional valve of the huddling chamber type, the valve being seated.
Fig. 8 is a sketch showing the characteristic static pressure force curve for a valve of the type shown in Fig. 7.

The characteristic load-lift or force curve (regardless of the pressure) for a valve of the huddling chamber type is illustrated in Fig. 8. Assuming that the straight line S is a graph of the normal spring load at different lifts, the point M at which the load-lift curve L intersects the curve S represents the pop-lift at which the load imposed by the spring and the lifting force are in equilibrium. It is characteristic of the load-lift curve of such a valve that its highest point is far to the left of the ordinate Z corresponding to the maximum full capacity lift, the curve gradually decreasing in height from its highest point toward the right. It is evident that with this type of valve (depending upon static pressure alone for raising the valve head) a high lift is not attainable even if the pressure accumulates above the pop pressure, as represented by the dotted curve A in Fig. 8 which shows that the pop-lift point M', corresponding to this accumulated pressure, is still far to the left of the ordinate Z.

The blowdown is represented by the maximum distance between the curves L and S. This distance must be kept small in order to insure the required low blowdown. If, in the endeavor to increase lift, a weak spring be used, the slope of line S will become less and the point M of the curve L will move to the right, but with a resultant increase in the maximum distance between the curve L and the curve S, thus indicating increased blowdown. If a stiffer spring be employed, the slope of line S will become greater and the blowdown will decrease, but the lift correspondingly decreases. It is thus substantially impossible to obtain high capacity coupled with low blowdown with a valve depending wholly or principally upon static pressure to lift the valve from its seat.

Figures 9, 10:
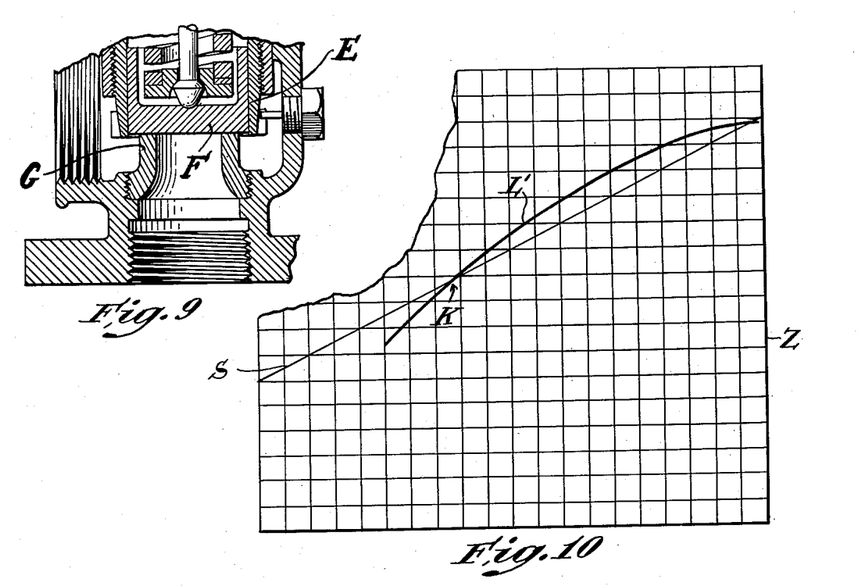
Fig. 9 is a fragmentary vertical section showing a conventional valve of the simple reaction type.
Fig. 10 is a sketch showing the characteristic reaction force curve for a valve of the type shown in Fig. 9.

To increase capacity, resort has been had to valves of the reaction type, as above referred to, wherein high lift, far above that resulting from static pressure alone, is attained by deflecting the escaping fluid from its normal path. The characteristic load-lift curve $L^1$ for such a reaction type valve is shown in Fig. 10. It is here assumed that the valve has already been lifted from its seat to the pop-lift point before the reaction effect begins to take place. As shown in Fig. 10, the curve $L^1$ first crosses the spring curve S at the point K (to the right of the pop-lift point) and forms a pronounced upwardly convex arc above the spring curve S.

While the arrangement graphically illustrated by this curve $L^1$ (Fig. 10) may provide substantially maximum capacity, the high upwardly convex hump of the curve $L^1$ indicates a failure to provide low blowdown. This upwardly directed hump in the curve is characteristic of almost all prior valve designs to which the attempt is made to approximate maximum capacity. In order that the valve may have the desired low blowdown, its design must be so modified that the hump is reduced and the curve $L^1$ becomes nearly straight and closer to the spring curve S.

Figure 11:
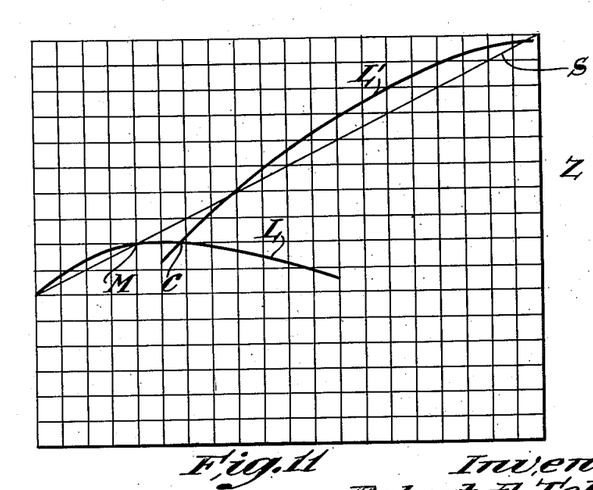
Fig. 11 is a sketch showing independent force curves, one showing the static pressure force and the other the reaction force.

Fig. 11 shows the static pressure curve L and the reaction pressure curve $L^1$ independently. These curves intersect at the point C, forming a pronounced downwardly directed cusp below the spring curve S. This cusp clearly shows that the static pressure is diminishing before the reaction force becomes effective, indicating that the effective lifting force does not increase incrementally with the increase in spring force.

If by some means the point C could be caused to approach the spring curve S, or better, to rise above the spring curve so that the curves L and L¹ would smoothly merge above the spring curve, optimum results as respects capacity and blowdown might be expected.

The device of the present invention is commercially practical, being readily adjustable to substantially all ordinary conditions of use, whether with saturated or superheated steam, and provides the desired high capacity coupled with low blowdown as evidenced by the shape of the curve L—L (Fig. 6), which is the load-lift curve of a valve embodying the present invention, it being noted that the load-lift curve L—L is devoid of any cusp such as that shown in Fig. 11, and that it is smoothly continuous and lies close to and substantially parallel to the spring curve S except near its extreme ends.

The desirability of avoiding excessive reaction or jet effect in full capacity, high-lift valves (so as to permit low blowdown) has long been appreciated and attempts have been made to attain this result. Thus, it has heretofore been proposed (Fig. 14) to provide the fixed cylindrical deflector sleeve 100 in which the valve head 101 slides, with an annular, internal, peripheral channel 102 from which exhaust ports 103 of substantial capacity lead radially out to the atmosphere. In describing the operation of such an arrangement it has been suggested that as soon as the popping pressure is reached, the valve disk rises without pause or hesitation, the steam entering the annular channel 102 in the deflector and escaping laterally through the delivery ports 103, thus preventing a building up of pressure under the valve head. Since the channel 102 extends about the entire circumference of the deflector cylinder 100 and has substantially horizontal bottom and top walls, the area of the annular opening through which steam from beneath the valve disk escapes into the channel, increases in direct proportion to the valve lift (see graph 105, Fig. 16) and thus the amount of steam which escapes laterally increases at a substantially constant rate up to full lift.

However, the reaction or jet effect of the escaping steam diminishes as a valve rises and thus, in order to insure full lift, the rate at which the lateral escape aperture increases in area should likewise diminish as the valve opens, otherwise the force curve will intersect the spring curve at a point such as to indicate failure of the valve to attain full lift.

In the patent to Falls No. 2,345,389, an arrangement is shown in which it is proposed to attain high lift without sacrifice of low blowdown by completely cutting off the amount of steam escaping laterally as the valve approaches full lift. In this arrangement the valve head overhangs the seat to a substantial amount and this overhang provides a deflecting surface of constant area which is impinged upon by the steam at first opening, and which is responsible for a major part of the reactive action. The fixed cylindrical deflector, in which the valve head slides, is provided with radial escape ports and the valve head itself has a peripheral channel into which steam flows as soon as the valve head rises. The rate at which the escape area increases is thus proportioned to the lift, in substantially the same way as in the device of Fig. 14 and as illustrated by the graph 105. When the valve head nears the half-way point in its lift, the upper part of the channel comes opposite to the escape ports and steam escapes radially through the ports, thus reducing the reaction effect. However, the channel in the valve head is so located that before full lift is attained, the lower wall of the channel has moved upwardly beyond the top elements of the escape ports so as completely to cut off lateral escape to compensate for the decreased reaction effect, thus insuring full lift.

While in theory the arrangement shown in this Falls patent is desirable and should result in the desired mode of operation whereby full lift coupled with low blowdown is obtained, it has been found in practice that an arrangement such as shown in this patent, while useful at a particular steam pressure and for steam of a particular type (definite degree of saturation or superheat), it is not of such general utility as is desirable in a commercial type of valve.

Figure 1:
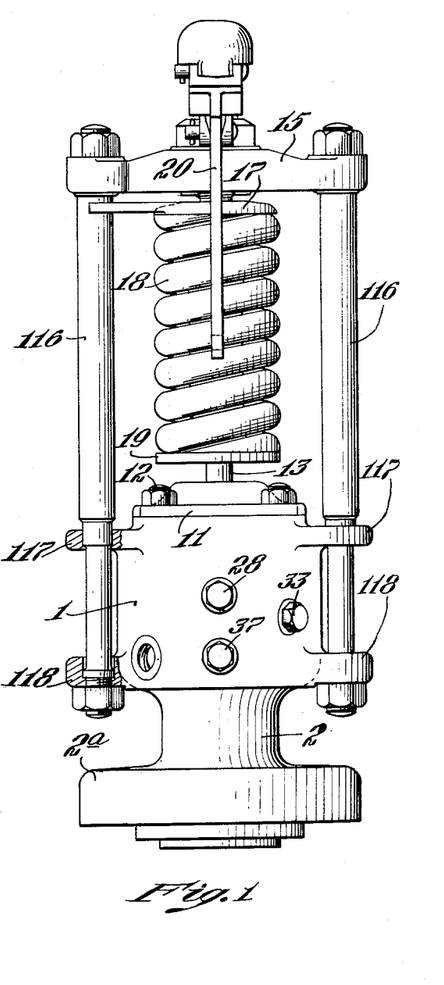
Fig. 1 is a side elevation of a valve embodying the present invention.
Figure 2:
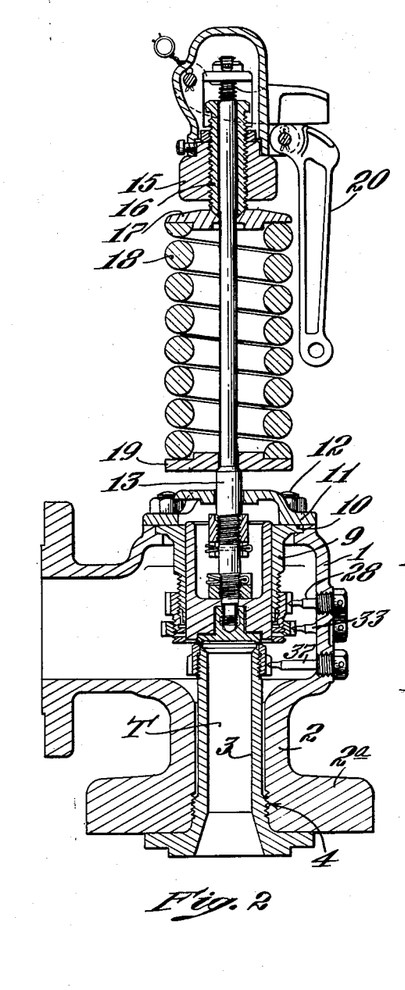
Fig. 2 is a vertical diametrical section on a plane substantially at right angles to Fig. 1.
Figure 3:
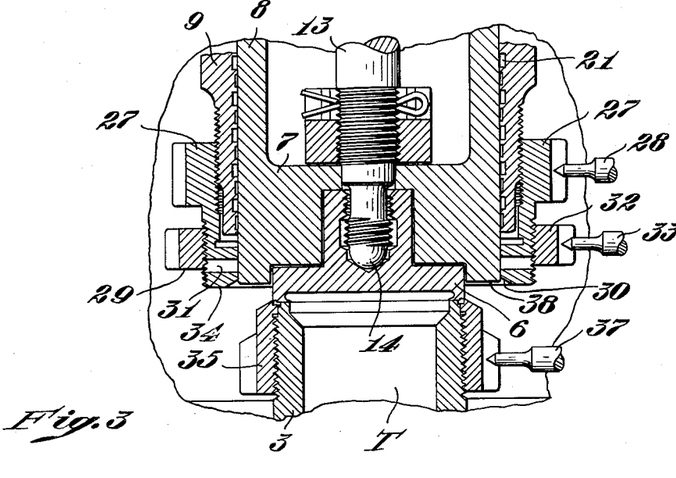
Fig. 3 is a fragmentary section on the same plane as Fig. 2 but to larger scale, showing the valve disk seated.

The means whereby high lift, low blowdown and adaptability to various conditions of use is obtained in accordance with the present invention is illustrated in the drawings, wherein the numeral 1 (Fig. 1) designates the casing of the valve. This casing is usually a casting or forging, and, as illustrated, has a neck portion 2 and the bottom flange 2ª by means of which it is secured to a pressure container, such as a boiler, superheater or the like. A seat-supporting sleeve or throat tube 3 is here shown as arranged within the neck portion of the casing in coaxial relation thereto, being secured to the casing at the point 4 within the thickness of the flange 2. This sleeve or tube 3 defines the throat passage T through which the pressure fluid flows when the valve is open. The annular valve seat 5 (Fig. 5) is formed at the upper edge of the tube 3. As here shown, this valve seat is flat, but seats of other usual types may be used. The valve disk 6 has an annular seat-engaging surface 6ª designed to make leak-tight contact with the seat 5 when the valve is closed. The disk 6, as here illustrated, is housed within a cavity in the lower end or head 7 of a piston 8 comprising a cylindrical skirt portion which slides in a fixed guide sleeve 9. As here illustrated (Fig. 2), this guide sleeve has a radial flange 10 at its upper end which rests upon a seat surface formed in the upper part of the casing, and is clamped to the casing by means of an annular cover 11 held in place by means of bolts 12. However, the guide sleeve may be supported in any customary or desirable way.

The valve spindle 13 passes through the central aperture in the cover 11, its lower end 14 resting in a socket in the valve disk 6. The disk is united to the spindle so as to be lifted from the seat when the spindle is raised, the connection between the spindle and disk being of any desirable and/or usual kind.

The valve bonnet is here shown as of the general type more fully described in the patent to Corcoran, No. 2,443,851, June 22, 1948, comprising the rigid bridge member 15 which is connected to the valve casing proper by diametrically opposed parallel tension rods 116 which pass through aligned openings in ears 117 and 118 integral with the valve casing, the rods being spaced from the casing proper and being provided with screw threads and nuts at their upper and lower ends. The bridge member 15 has a central screw-threaded bore which receives a tubular, spring-adjusting screw 16 whose lower end is received in a socket in the upper spring abutment disk 17. The coiled, compression, loading spring 18 bears at one end against the disk 17 and at its other end against an annular disk 19 which rests upon a shoulder of the spindle 13. The usual lifting lever 20 is provided for use in raising the valve from its seat for testing or other purposes.

Figure 5:
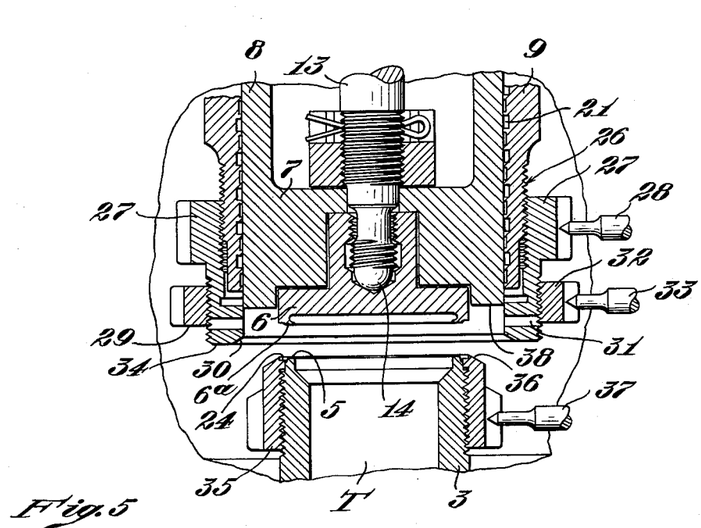
Fig. 5 is a view similar to Fig. 3 but showing the valve fully open.

As illustrated in Fig. 5, the inner, peripheral surface of the fixed guide 9 is preferably provided with a series of circumferential grooves 21 which collectively constitute a fluid-type seal to prevent leakage between the piston and the sleeve 9 while reducing friction between the sleeve and guide to a minimum. Such fluid seals are customary in valves of this general type, as illustrated, for example in the patent to Corcoran, No. 2,151,501, March 21, 1939.

The lower edge of the fixed guide sleeve 9 is located in a horizontal plane substantially spaced from the plane of the valve seat 5, in fact in a plane which is above the plane of the lower end surface 38 of the piston 8 when the valve is in its extreme uppermost position. The exterior surface of the guide sleeve 9 is screw threaded, as shown at 26, for the reception of a deflector sleeve or ring 27 whose lower edge 34 constitutes the effective element in respect to the deflecting of the escaping steam. This ring 27 may be adjusted up and down by rotating it relatively to the fixed guide sleeve 9, and is provided with any suitable means, for example, the radially adjustable pin 28 engageable with vertical slots in the outer periphery of the sleeve or ring 27 to hold the latter in adjusted position. The lower edge 29 of the ring 27 is preferably provided with a beveled inner margin 30. Radial, cylindrical delivery ports 31 of uniform diameter are provided in the lower portion of the vertically adjustable deflector ring 27. The lowermost elements of these ports are in a plane above the plane of the inner edge of the beveled surface 30 a distance, for example, of the order of $\frac{1}{16}$ inch. These ports extend all of the way from the inner cylindrical surface to the outer surface of the ring and are preferably spaced apart equally about the ring 27. The number and size of the ports 31 may vary with the capacity of the valve. For example, but without limitation, twenty-four ports, each of 0.156 inch in diameter may be provided in a two inch valve. These escape ports are of such collective capacity that when they are fully open they permit a substantial portion of the steam which escapes over the valve seat to move out in a horizontal direction, thus decreasing the reactive force. Preferably a port-adjusting ring 32 has screw-threaded engagement with threads on the outer surface of the lower portion of the deflector ring 27. This ring 32 may be adjusted vertically by rotating it relatively to the ring 27, and when adjusted may be held in adjusted position by the rotatable pin 33. When raised to its highest point, the lower edge 29 of the ring 32 is in a plane at least as high as the upper elements of the ports 31, thus leaving the entire area of each port free and unobstructed. On the other hand, by turning the ring 32, its lower edge 29 may be moved down to a level such as to close the ports 31. Instead of having direct screw-threaded engagement with the deflector ring 27, the occluding ring may have a telescopic sliding fit over the lower part of the deflector ring, and, in that event, would be provided with such retaining and/or adjusting means, for example, screws, as might be desirable.

As illustrated, the valve is provided with a nozzle or blowdown ring 35 whose upper edge 36 is spaced radially outward from the valve seat. The upper edge 36 will usually be in a plane slightly above that of the valve seat, for example, a distance of from 0.007 to 0.010 inch above the plane of the valve seat. The ring 35 is screw threaded to the upper part of the throat tube 3, and, by turning it, the position of its upper edge 36 may be varied. A pin 37 holds the ring 35 in adjusted position.

With this arrangement, when the pressure within the throat tube 3 increases to a point such that the valve disk 6 rises very slightly from its seat, steam escaping over the seat exerts static pressure upon the entire under surface of the valve disk and piston, thereby raising the disk to a height which will approximate from 20 to 25 per cent. of the total required lift. This lift is occasioned by the presence of the ring 35 which confines the steam at the instant of first opening to the extent necessary to build up the required static pressure. The force curve L representing this action is that shown in Fig. 8, the pop-lift point M being approximately 20 per cent. of the total required lift.

Figures 4, 6:
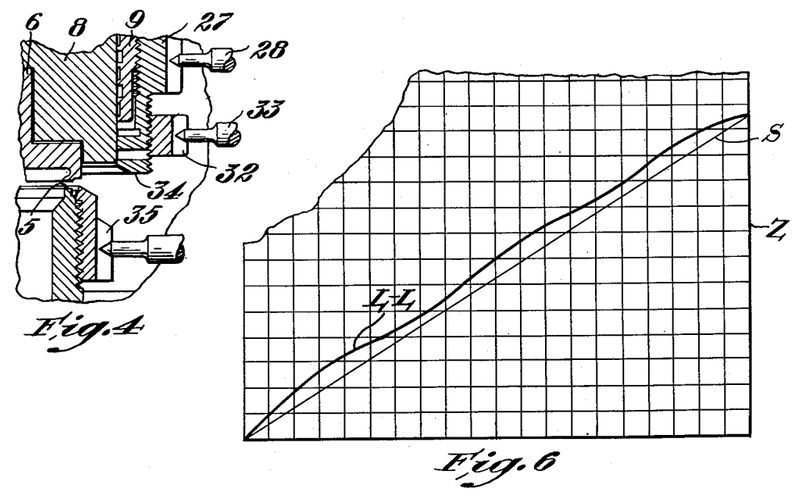
Fig. 4 is a fragmentary section on the plane of Fig. 3 but showing the valve disk raised from its seat and at the point where the maximum reactive force is effective.
Fig. 6 is a sketch illustrating the characteristic force curve of the valve of the present invention.
Figure 12:
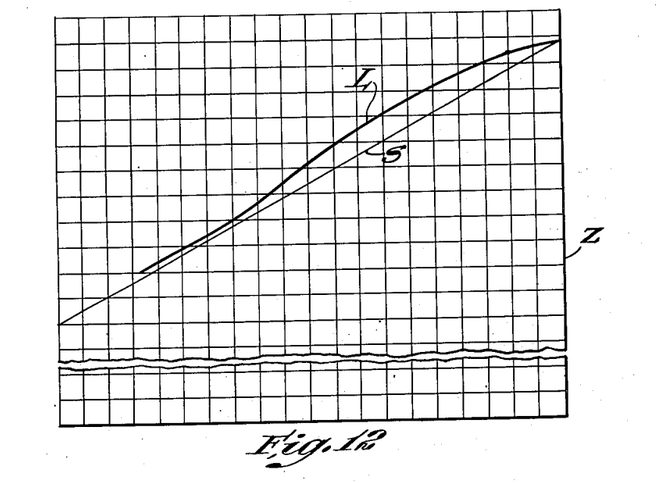
Fig. 12 is a sketch showing the characteristic force curve of a commercial type of reactive valve having its deflector ring set low to compensate for an unduly stiff spring.

As soon as the lower face 38 of the piston 8 rises above the plane of the lower face 34 of the ring 27 a reaction effect begins to take place, the steam which escapes being diverted downwardly first by the inclined or beveled face 30. The piston continues to move up into the guide cylinder 9 until its lower surface 38 is, for illustrative example, 0.015 to 0.025 inch above the plane of the surface 34 of ring 27 (Fig. 4). The lower portion of the vertical cylindrical inner wall of the ring 27 now turns the escaping steam through substantially 180° so that its kinetic energy is effectively used to obtain maximum lift. The effect of such a powerful reaction force, resultant from the low deflector ring (unless modified as provided by the present construction) would be that shown in Fig. 12. As indicated in Fig. 12, the load-lift curve $L^1$ lies well above the spring curve, thus showing that the valve does not produce the desired low blowdown.

Figure 13:
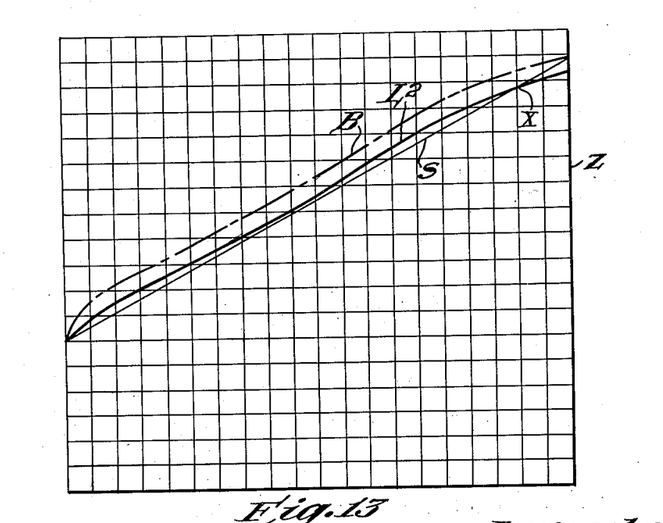
Fig. 13 is a sketch showing the force curve of the same valve modified by the provision of the delivery ports according to the present invention.
Figure 16:
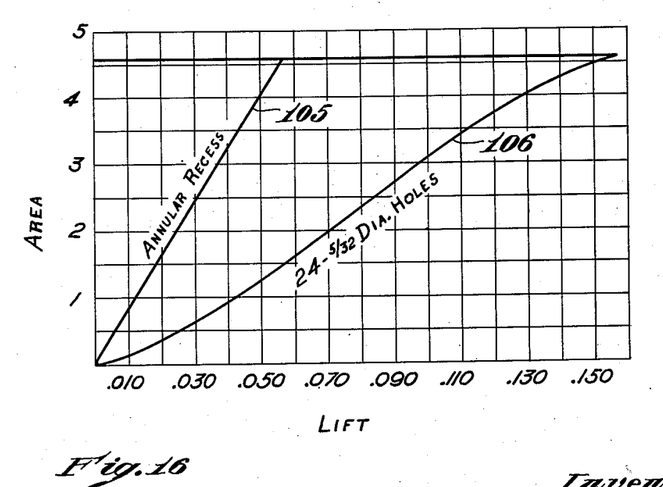
Fig. 16 is a chart, comprising graphs illustrative of the rate of increase in effective port area of the devices of Figs. 14 and 15 respectively.

Fig. 13 and graph 106 (Fig. 16) illustrate the effect of the independent ports 31. Steam begins to escape horizontally through the ports 31 as soon as the lower face 38 of the piston rises above the horizontal plane of the lowermost elements of the ports 31, this action beginning when the valve head has risen, for example, 30 per cent. of its total lift. As the lower surface 38 of the valve head starts to rise past the inner end of the port 31 (Fig. 4) the initial shape of the opening port is that of a small segment of a circle. This segment increases in transverse dimensions up to the full diameter of the port and then again diminishes in width as the valve head approaches full lift. Thus, the rate of increase in effective area of the port varies, as shown, for example, by the graph 106 (Fig. 16). The area increases slowly at first, then at a more nearly constant rate and then from approximately 60 per cent. up to total lift at a diminishing rate.

Figure 14:
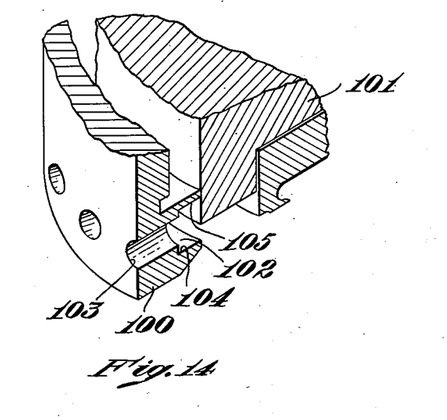
Fig. 14 is a fragmentary perspective view, showing a valve having radial exhaust ports connected by an annular channel at their inner ends.
Figure 15:
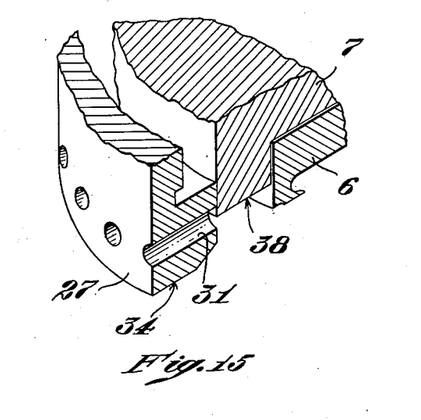
Fig. 15 is a view similar to Fig. 14, but showing a construction wherein the radial exhaust ports are independent, that is not connected by a radial channel.

Comparison of the graphs 105 and 106 illustrates the effect of an annular channel connecting the ports, as illustrated in Fig. 14 (or as shown in the Falls patent), as contrasted with the action of the simple, independent radial ports of the present invention. For specific example, and assuming a 2 inch standard valve having twenty-four radial ports, each $\frac{1}{32}$ inch in diameter; and a deflector ring having an inside diameter of approximately 2.583 inches, at a lift of 0.020 inch, the total effective exhaust area, when the ports are connected by an annular channel (as in Fig. 14), is 0.1625 square inch, whereas, without the channel the total effective area of the ports would be 0.0345 square inch. Thus, the presence of the annular channel results, as the valve head rises, in a very sudden opening of the exhaust and a consequent almost instantaneous reduction in the reaction effect, whereas, without the channel, the reaction force is effective until near the upper part of the valve lift when it gradually diminishes, thus insuring the desired full lift and low blowdown. As shown in Fig. 13, the load-lift curve $L^2$ lies very close to the spring curve throughout the greater portion of the lift. Although the curve $L^2$ may cross the spring curve at the point X and lie below the spring curve to the right of that point (indicating that the valve may not rise completely to the desired full lift), it is permissible to rate capacity upon the basis of accumulated pressure, and thus (if the broken line B of Fig. 13 indicate such accumulated pressure) the actual effective load-lift curve (paralleling curve $L^2$) intersects the spring curve substantially at the full lift point, thus indicating substantially full capacity. However, both curves B and $L^2$ (Fig. 13) lie approximately parallel to spring curve S and are devoid of pronounced humps or cusps, thus showing low blowdown.

Thus, by the present construction, provision is made for the popping of the valve in response to static pressure in the manner customary in valves of the huddling chamber type and with a pop-lift point of from 20–30 per cent. of the total lift. The further lifting of the valve is accomplished by reaction force, but this reaction force is so controlled that during the upper portion of the lift the reaction force is diminished at a progressively decreasing rate to insure full lift but without preventing the valve from closing with low blowdown. The rings 27 and 32 provide for adjustment of the point in the valve lift at which the reaction effect begins to take place and the point in the lift at which the reaction force begins to lessen, these adjustments being readily made without dismantling the valve, and, if desired, as the result of experimental tests, to insure the best results under any given conditions of use, whether with saturated steam or other vapor or with superheated steam.

By moving the ring 27 up or down, it is possible to insure a smooth transition from static pressure effect to reaction effect, or, speaking graphically, to move the point C (Fig. 11) at which the curves (representing these respective forces) intersect, to the optimum position relatively to the spring curve.

While the pressure fluid whose escape is controlled by the valve herein described has, for convenience, been referred to as "steam," it is to be understood that the principle of the invention is applicable to valves designed for use with other pressure fluids.

While a desirable embodiment of the invention has been illustrated by way of example, it is to be understood that the invention is broadly inclusive of any and all modifications falling within the scope of the appended claims.

I claim:
1. In combination in a reaction type pop safety valve of the kind having a valve seat, a vertically adjustable nozzle ring coaxial with the seat, the upper part of the nozzle ring being so shaped as to permit substantially free lateral expansion of the fluid which escapes over the valve seat, a valve head, a loading spring and a fixed cylindrical guide coaxial with the valve seat and which constitutes a guide for the valve head, the lower end of the cylindrical guide being above the plane of the valve seat, a deflector ring coaxial with and having screw-threaded engagement with the lower portion of the cylindrical guide, the lower edge of the deflector ring being below the lower edge of the cylindrical guide and being designed and arranged to deflect the fluid which escapes over the valve seat thereby to establish a reaction force tending to lift the valve head to the full open position, said deflector ring having a plurality of independent cylindrical delivery passages of substantially uniform diameter each extending all of the way from its inner to its outer surface, the entrances to said passages being below the lower edge of the fixed cylindrical guide and above the plane of the valve seat, the valve head having a cylindrical skirt portion which telescopes within the fixed guide cylinder and which normally closes the entrances to said delivery passages, the entrances to the delivery passages being so located that during opening the valve rises to approximately 30 per cent of its full lift before any part of the delivery passages is uncovered.

2. In combination in a reaction type pop safety valve of the kind having a valve seat, a vertically adjustable nozzle ring coaxial with the seat, the upper part of the nozzle ring being so shaped as to permit substantially free lateral expansion of the fluid which escapes over the valve seat, a valve head, a loading spring and a fixed cylindrical guide coaxial with the valve seat and which constitutes a guide for the valve head, the lower end of the cylindrical guide being above the plane of the valve seat, a deflector ring coaxial with the guide cylinder and which is axially adjustable relatively to the guide cylinder, the lower edge of the ring being below the plane of the lower edge of the guide cylinder and being designed and arranged to deflect fluid which escapes over the valve seat thereby to establish a reaction force tending to lift the valve head to full open position, said deflector ring having circumferentially spaced, independent substantially radial delivery orifices extending all of the way from its inner to its outer surface, said orifices being below the lower edge of the fixed cylindrical guide and being normally closed by a part which moves in timed relation to the valve head, the parts being so designed and arranged that said orifices begin to open when the valve has risen from its seat to approximately 30 per cent. of its maximum lift and are not completely closed before the valve head reaches full lift.

3. In combination in a reaction type pop safety valve of the kind having a valve seat, a vertically adjustable nozzle ring coaxial with the seat, the upper part of the nozzle ring being so shaped as to permit substantially free lateral expansion of the fluid which escapes over the valve seat, a valve head, a loading spring and a fixed cylindrical guide coaxial with the valve seat and which constitutes a guide for the valve head, the lower end of the cylindrical guide being above the plane of the valve seat, a deflector ring coaxial with the cylindrical guide, the upper portion of said ring having screw-threaded engagement with the guide whereby the ring may be adjusted axially, means for holding the ring in adjusted position, the lower edge of the ring being below the lower edge of the cylindrical guide and being operative to deflect fluid escaping over the valve seat thereby to establish a reaction force tending to lift the valve head to full open position, said deflector ring having at least one delivery orifice of circular transverse section adjacent to but spaced from its lower edge and leading all of the way from its inner to its outer surface, said orifice being below the lower edge of the cylindrical guide, the orifice normally being closed by a part which moves in timed relation to the valve head, said part moving relatively to the deflector ring so as progressively to uncover the entrance to the orifice, beginning when the valve head has risen approximately 30 per cent. of the total lift.

4. In combination in a reaction type pop safety valve of the kind having a valve seat, a vertically adjustable nozzle ring coaxial with the seat, the upper part of the nozzle ring being so shaped as to permit substantially free lateral expansion of the fluid which escapes over the valve seat, a valve head, a loading spring and a fixed cylindrical guide coaxial with the valve seat and which constitutes a guide for the valve head, the lower end of the cylindrical guide being above the plane of the valve seat, a deflector ring coaxial with the guide cylinder and which is axially adjustable relatively to the guide cylinder, the lower edge of said deflector ring being below the plane of the lower edge of the guide cylinder and being designed and arranged to deflect fluid which escapes over the valve seat thereby to establish a reaction force tending to lift the valve head to fully open position, the deflector ring having circumferentially spaced wholly independent delivery orifices having circular entrance ends, each orifice extending from the inner to the outer surface of the deflector ring, the entrances to said orifices being below the lower edge of the cylindrical guide, the valve head being carried by a piston which slides within the cylindrical guide and which normally closes the entrances to said delivery orifices but which gradually uncovers said orifices during the upward travel of the valve head, and means for simultaneously varying the effective size of the several orifices.

5. In combination in a reaction type pop safety valve of the kind having a valve seat, a vertically adjustable nozzle ring coaxial with the seat, the upper part of the nozzle ring being so shaped as to permit substantially free lateral expansion of the fluid which escapes over the valve seat, a valve head, a loading spring and a fixed cylindrical guide coaxial with the valve seat and which constitutes a guide for the valve head, the lower end of the cylindrical guide being above the plane of the valve seat, a deflector ring coaxial with the guide cylinder and which is axially adjustable relatively to the guide cylinder, the lower edge of said deflector ring being below the plane of the lower edge of the guide cylinder and being designed and arranged to deflect fluid which escapes over the valve seat thereby to establish a reaction force tending to lift the valve head to fully open position, the deflector ring having a plurality of circumferentially spaced independent delivery orifices extending from its inner to its outer surface, the entrances to said orifices being circular and located below the lower edge of the cylindrical guide, a piston having a recess in its head within which the valve head is housed, the piston moving with the valve head, the piston being operative to close said delivery orifices when the valve head is seated but uncovering the entrances to said orifices during the upward travel of the valve head, and an orifice-adjusting ring coaxial with the deflector ring and movable axially relatively to the latter, thereby concomitantly to vary the effective size of the several delivery orifices, and means for holding said adjusting ring in adjusted position.

6. In combination in a reaction type pop safety valve of the kind having a valve seat, a vertically adjustable nozzle ring coaxial with the seat, the upper part of the nozzle ring being so shaped as to permit substantially free lateral expansion of the fluid which escapes over the valve seat, a valve head, a loading spring and a fixed cylindrical guide coaxial with the valve seat and which constitutes a guide for the valve head, the lower end of the cylindrical guide being above the plane of the valve seat, a deflector ring coaxial with the guide cylinder and which is axially adjustable relatively to the guide cylinder, the lower edge of said deflector ring being below the plane of the lower edge of the guide cylinder and being designed and arranged to deflect fluid which escapes over the valve seat thereby to establish a reaction force tending to lift the valve head to fully open position, the deflector ring having circumferentially spaced independent delivery orifices extending all of the way from its inner to its outer surface, the entrances to said orifices being below the lower edge of the cylindrical guide, a cylindrical member sliding in said fixed guide and which moves with the valve head and which normally closes the entrances to the several orifices when the valve head is seated and which gradually uncovers said entrances during the upward travel of the valve head, and a regulating ring coaxial with and engaging the outer peripheral surface of the deflector ring, said regulating ring being movable axially of the deflector ring and being operative simultaneously to vary the effective sizes of the delivery ends of the several delivery orifices in the deflector ring.

7. A pop safety valve of the kind in which a valve disk is normally held against a seat by a loading spring and wherein the valve disk has a cylindrical skirt portion sliding in a fixed guide cylinder, the lower part of the guide cylinder being externally screw threaded for engagement with an internally screw-threaded deflector ring, and a deflector ring, coaxial with and above the plane of the valve seat, having screw threaded engagement with the lower portion of the guide cylinder characterized in that the deflector ring has a plurality of circumferentially spaced, independent radial escape ports each leading from its inner to its outer peripheral surface, said ports being below the lower edge of the guide cylinder and above the level of the valve seat, the deflector ring being externally screw threaded, and an internally screw-threaded, port-occluding ring engaging the external screw threads of the deflector ring and being operative simultaneously to vary the effective size of all of said ports.

8. In combination in a spring-loaded safety valve having a throat passage terminating at an annular valve seat, a valve disk, a loading spring normally holding the disk against the seat, the valve disk having a cylindrical skirt portion, a normally stationary guide sleeve with which the cylindrical skirt portion of the valve disk has sliding engagement, the lower edge of the guide sleeve being in a plane above the plane of the lower face of the valve disk at maximum lift, an adjustable deflector sleeve coaxial with the guide sleeve and adjustable axially relatively to the latter, said deflector sleeve having an inwardly and upwardly beveled annular face at its lower end and having a series of independent, equally spaced cylindrical discharge ports each leading from its inner to its outer periphery, said ports being below the lower edge of the stationary guide sleeve and above the plane of the valve seat, the lowermost elements of said discharge ports being above the inner edge of the beveled face of the deflector sleeve, and a part which moves in timed relation with the valve disk which normally closes all of said ports.

9. In combination in a spring-loaded safety valve having a throat passage terminating at an annular valve seat, a valve disk, a loading spring normally holding the disk against the seat, the valve disk having a cylindrical skirt portion, a normally stationary guide sleeve with which the cylindrical skirt portion of the valve disk has sliding engagement, the lower edge of the guide sleeve being in a plane above the plane of the valve seat, an adjustable deflector sleeve coaxial with the guide sleeve and adjustable axially relatively to the latter, said deflector sleeve having a series of independent, equally spaced cylindrical delivery ports each leading from its inner to its outer peripheral surface, said ports being below the lower edge of the guide cylinder and above the plane of the valve seat, the lowermost elements of said ports being spaced above the lower edge of the deflector sleeve, adjusting means, external to the deflector sleeve, operative simultaneously to vary the effective areas of said ports, and means movable in timed relation to the valve disk normally closing all of said ports but opening them as the valve head rises.

10. In combination in a spring-loaded safety valve having a throat passage terminating at an annular valve seat, a valve disk, a loading spring normally holding the disk against the seat, the valve disk having a cylindrical skirt portion, a normally stationary guide sleeve with which the cylindrical skirt portion of the valve disk has sliding engagement, the lower edge of the guide sleeve being in a plane above the plane of the valve seat, an adjustable deflector sleeve coaxial with the guide sleeve and adjustable axially relatively to the latter, said deflector sleeve having a series of independent, equally spaced radially disposed discharge ports each leading from its inner to its outer periphery, said ports being below the lower edge of the guide cylinder and above the plane of the valve seat, the deflector sleeve being externally screw threaded, and internally screw-threaded, port-occluding ring having threaded engagement with the deflector sleeve and being operative simultaneously to vary the effective areas of said ports and means moving in timed relation to the valve head normally closing all of said ports.

11. In combination in a spring-loaded safety valve having a throat passage terminating at an annular valve seat, a valve disk, a loading spring normally holding the disk against the seat, the valve disk having a cylindrical skirt portion, a normally stationary guide sleeve with which the cylindrical skirt portion of the valve disk has sliding engagement, the lower edge of the guide sleeve being in a plane above the plane of the valve seat, an adjustable deflector sleeve coaxial with the guide sleeve and adjustable axially relatively to the latter, said deflector sleeve having an inwardly and upwardly beveled annular face at its lower end and having independent, radial delivery ports each leading from its inner to its outer periphery, said ports being located below the lower edge of the guide cylinder and above the plane of the valve seat, the lowermost elements of said ports being above the inner edge of said annular beveled face, a port-occluding ring coaxial with the deflector ring and embracing the latter, said port-occluding ring being axially adjustable relatively to the deflector ring thereby to vary the effective areas of said ports and means moving in timed relation to the valve disk normally closing all of said ports.

12. In combination in a spring-loaded pop safety valve of the reaction type wherein a cylindrical deflector sleeve, coaxial with the valve seat, normally deflects the steam during lift of the valve head, means providing an escape passage through which steam may escape from below the valve head without developing valve-lifting reaction force, the entrance to said passage being closed by an occluding element when the valve head is seated, said occluding element moving with the valve as the latter rises and beginning to uncover the entrance to said passage at a predetermined per cent. of the maximum valve travel, the transverse shape of the entrance to said passage being such that as the valve head rises, the rate of increase in the effective area of said passage varies, the area first slowly increasing and then as the valve nears full lift, slowly diminishing, and adjustable means for varying the effective area of the delivery end of said passage.

13. In combination in a spring-loaded pop safety valve of the reaction type wherein a cylindrical deflector sleeve, coaxial with the valve seat, normally deflects the steam during lift of the valve head, means providing an escape passage whose axis is substantially parallel to the plane of the valve seat and through which steam may escape from below the valve head without developing valve-lifting reaction force, the entrance to said passage being closed by an occluding element when the valve is seated, the occluding element moving with the valve as the latter rises and beginning to uncover the entrance to the passage at a predetermined point in the valve travel, means for adjusting the position of the entrance to the escape passage relatively to the plane of the valve seat thereby to determine the point in the valve travel at which said entrance will begin to be uncovered, the entrance to said passage being circular whereby the rate of increase in the effective size varies as the valve rises, the area of the entrance first slowly increasing and then as the valve head nears full lift, slowly diminishing, and means for varying the effective area of the delivery end of the passage.

14. A spring-loaded pop safety valve according to claim 14 wherein the deflector sleeve has a plurality of radial bores extending through it from its inner to its outer surface and which collectively constitute the escape passage through which steam may escape from below the valve head without developing valve-lifting reaction force, said radial bores being spaced symmetrically about the axis of the sleeve and being closed by the occluding element when the valve head is seated, the entrances to said bores being so spaced from the lower edge of the sleeve that as the occluding element rises with the valve head it begins to uncover the entrances to all of said cylindrical bores simultaneously at approximately 30% of the maximum valve travel, the entrances to said bores being at the inner surface of the sleeve and of circular shape so that as the valve head rises the rate of increase of the effective, collective area of the bores varies as the valve head lifts, said collective area first increasing slowly and then as the valve head approaches full lift, slowly diminishing.

ROBERT A. TOBIS.

REFERENCES CITED

The following references are of record in the file of this patent:

UNITED STATES PATENTS

| Number | Name | Date |
|---|---|---|
| 2,278,437 | Gentzel | Apr. 7, 1942 |